United States Patent
Tertel et al.

(10) Patent No.: US 9,303,214 B2
(45) Date of Patent: Apr. 5, 2016

(54) PROCESS, VESSEL, AND APPARATUS FOR REMOVING ONE OR MORE SULFUR COMPOUNDS

(75) Inventors: Jonathan Andrew Tertel, Mt. Prospect, IL (US); Jasna Karagic, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 578 days.

(21) Appl. No.: 13/408,177

(22) Filed: Feb. 29, 2012

(65) Prior Publication Data

US 2013/0220888 A1    Aug. 29, 2013

(51) Int. Cl.
*B01D 47/06* (2006.01)
*C10G 31/10* (2006.01)

(52) U.S. Cl.
CPC .............. *C10G 31/10* (2013.01); *B01D 47/06* (2013.01)

(58) Field of Classification Search
None
See application file for complete search history.

(56) References Cited

U.S. PATENT DOCUMENTS

| | | | |
|---|---|---|---|
| 4,469,663 A * | 9/1984 | Crump et al. | 423/243.05 |
| 4,472,179 A | 9/1984 | Adrian et al. | |
| 4,475,472 A | 10/1984 | Adrian et al. | |
| 5,024,684 A | 6/1991 | Tank | |
| 8,028,975 B2 | 10/2011 | Tertel et al. | |
| 8,047,509 B2 * | 11/2011 | Towler | 261/118 |
| 2009/0115076 A1 | 5/2009 | Makhotkin et al. | |
| 2010/0122936 A1 * | 5/2010 | Tertel et al. | 208/208 R |
| 2011/0239862 A1 | 10/2011 | Davydov | |
| 2012/0000826 A1 | 1/2012 | Tertel | |

OTHER PUBLICATIONS

Abstract of RU 2232043 C1, published Jul. 10, 2004.
Abstract of RU 2253559 C2, published Aug. 20, 2005.
Kuzmin et al., "Vortex centrifugal bubbling reactor", Chemical Engineering Journal, 2005, vol. 107, pp. 55-62.
"The Industry's Largest Selection of Conventional Nozzles", Spraying Systems Co, no later than Dec. 2011, 2 pages.

* cited by examiner

*Primary Examiner* — Duane Smith
*Assistant Examiner* — Phillip Shao
(74) *Attorney, Agent, or Firm* — James C. Paschall

(57) ABSTRACT

One exemplary embodiment can be a process for removing one or more sulfur-containing hydrocarbons. The process can include sending a stream including one or more alkaline compounds, one or more hydrocarbons, and one or more sulfur compounds to a stack of a disulfide separator, and sending a fluid downstream of a distributor to a vortex contacting device for providing a gas having no more than about 100 ppm, by weight, sulfur. Often, the stack includes one or more walls surrounding a void and the distributor positioned within the void, and is adapted to receive the stream having one or more phases.

5 Claims, 3 Drawing Sheets

PROCESS, VESSEL, AND APPARATUS FOR REMOVING ONE OR MORE SULFUR COMPOUNDS

FIELD OF THE INVENTION

This invention generally relates to a process, a vessel, and an apparatus for removing one or more sulfur compounds.

DESCRIPTION OF THE RELATED ART

Often, hydrocarbon and gas streams are treated to remove sulfur-containing compounds, such as mercaptans. Generally, such compounds are removed because of their malodorous scent.

Mercaptans can be designated R—S—H where R is often a light hydrocarbon radical such as methyl or ethyl. Typically, mercaptans concentrate in hydrocarbon liquid streams separated in a process facility. Many processes can be used to remove mercaptans and other sulfur-containing compounds. Often, such processes can use a caustic stream contacting the hydrocarbon stream in an extractive system.

After use, the caustic stream may be regenerated. As such, air may be used for oxidizing mercaptans to disulfide oils. The unreacted components of the air stream, e.g. nitrogen, oxygen, and other inert gases, are separated from the caustic and disulfide oils. Often, a separation vessel allows the unreacted air components to exit in a vent gas stream. Generally, the vent gas stream contains primarily air and small amounts of water, hydrocarbons, and one or more sulfur compounds, such as at least one disulfide oil. However, the presence of the one or more sulfur compounds can create regulatory concerns, particularly if the vent gas stream is provided to a fired heater.

As a consequence, it is desirable to provide devices that could be incorporated into existing apparatuses to facilitate the removal of one or more sulfur compounds in an economic and efficient manner.

SUMMARY OF THE INVENTION

One exemplary embodiment can be a process for removing one or more sulfur-containing hydrocarbons. The process can include sending a stream including one or more alkaline compounds, one or more hydrocarbons, and one or more sulfur compounds to a stack of a disulfide separator, and sending a fluid downstream of a distributor to a vortex contacting device for providing a gas having no more than about 100 ppm, by weight, sulfur. Often, the stack includes one or more walls surrounding a void and the distributor positioned within the void, and is adapted to receive the stream having one or more phases.

Another exemplary embodiment can be a separation vessel. The separation vessel may include a base defining an interior space at least for separating one liquid phase from another liquid phase and a stack adapted to receive a fluid having one or more phases and coupled to the base. Generally, the base includes a coalescer positioned in the interior space. Often, the stack defines a void and includes one or more walls surrounding the void, a first distributor positioned within the void, and a second distributor positioned above the first distributor and at least one spray nozzle coupled to the second distributor.

Yet a further exemplary embodiment may be an apparatus. The apparatus may include a separation vessel having a base and a stack, and a vortex contacting device downstream from the stack adapted to receive a second fluid from the stack. The base can define an interior space at least for separating one liquid phase from another liquid phase and may include a coalescer positioned in the interior space. The stack can be adapted to receive a first fluid having one or more phases and coupled to the base. Generally, the stack has one or more walls surrounding a void.

The embodiments disclosed herein can include contacting a wash oil with spent gases utilizing one or more spray nozzles or a flow directing device. As such, a stack of a separator may have a reduced height. Reducing the stack height may decrease the separator cost and increase transportability of, e.g., a replacement. The embodiments disclosed herein may also allow a decreased amount of fresh wash oil to be used, thereby reducing operating costs. By removing the majority of the disulfide oil vapor from a gas, the remaining gas may be routed to a carbon bed to absorb any remaining hydrocarbon vapor, allowing the gas to be vented to the atmosphere.

DEFINITIONS

As used herein, hydrocarbon molecules may be abbreviated C1, C2, C3 ... Cn where "n" represents the number of carbon atoms in the one or more hydrocarbon molecules.

As used herein, the term "alkaline" may be any alkaline material, e.g., compounds, such as ammonia ($NH_3$) and hydroxide compounds, which can neutralize an acid in solution. Some hydroxide compounds may be referred to as caustic. Exemplary caustic may include at least one of caustic soda (NaOH) and caustic alcohol ($C_2H_3ONa$).

As used herein, the term "rich" can mean an amount of generally at least about 50%, and preferably about 70%, by mole, of a compound or class of compounds in a stream.

As used herein, the term "substantially" can mean an amount of generally at least about 80%, preferably about 90%, and optimally about 99%, by mole, of a compound or class of compounds in a stream.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, an adsorber, or a vessel, can further include one or more zones or sub-zones.

As used herein, the term "gas" can mean one or more gases.

As used herein, the term "fluid" can mean one or more gases and/or one or more liquids. Sometimes, a fluid may include a dispersion of liquid droplets, often hydrocarbon droplets, dispersed in one or more gases. Generally, a fluid can include one or more gas, liquid, and/or suspension phases.

As used herein, the term "vapor" can mean a gas or a dispersion that may include or consist of one or more hydrocarbons.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g., a screw, a nail, a bolt, a staple, or a rivet; an adhesive; or a solder.

As described herein, the term "coalescer" is a device containing glass fibers or other material to facilitate separation of immiscible liquids of similar density.

As used herein, the term "immiscible" means two or more phases that cannot be uniformly mixed or blended.

As used herein, the term "phase" means a liquid, a gas, or a suspension including a liquid and/or a gas, such as a foam, aerosol, or fog. A phase may include solid particles.

As depicted, process flow lines in the figures can be referred to interchangeably as, e.g., lines, pipes, feeds, effluents, products, or streams.

DETAILED DESCRIPTION

Figure 1:
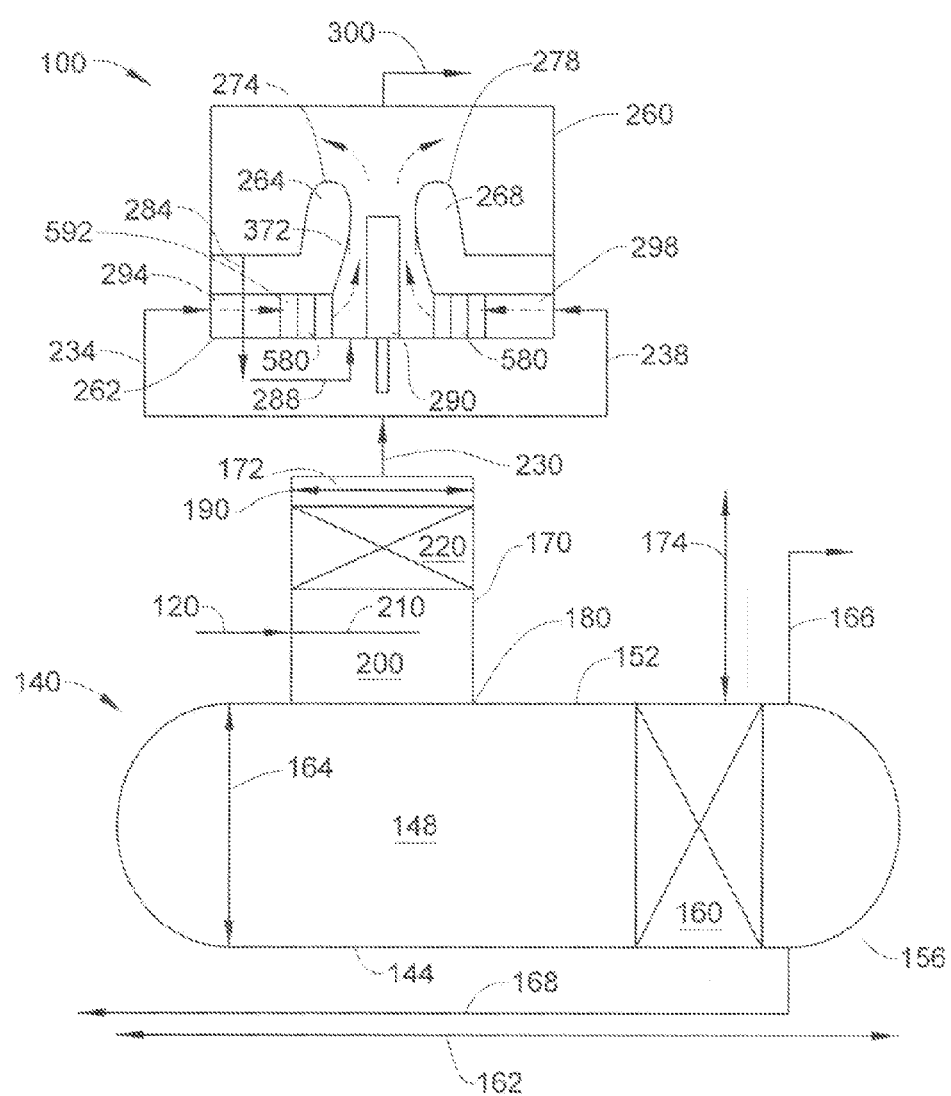
FIG. 1 is a schematic, cross-sectional depiction of an exemplary apparatus.

Referring to FIG. 1, an exemplary apparatus 100 for removing one or more sulfur-containing compounds, such as disulfides, from a stream 120 is depicted in FIG. 1. Often, the stream 120 can be a fluid or a first fluid having several phases. Typically, the apparatus 100 includes a separation vessel 140, such as a disulfide separator, and a vortex contacting device 260.

The vessels, lines and other equipment of the apparatus 100 can be made from any suitable material, such as carbon steel, stainless steel, or titanium. The stream 120 may include caustic and/or ammonia, one or more hydrocarbons, one or more sulfur compounds, and a gas. Typically, the one or more sulfur compounds include at least one disulfide oil. The stream 120 may be obtained from an oxidation vessel downstream from an extractor vessel, and such a unit is disclosed in, e.g., U.S. Pat. No. 8,028,975.

Usually, the stream 120 can include a gas phase, a liquid disulfide phase, and a liquid aqueous caustic phase. Generally, the gas phase includes air with at least some oxygen depletion. In the gas phase, the oxygen content can be about 5-about 21%, by mole.

The stream 120 can be provided to the separation vessel 140, which can include a base 144 and a stack 170. The separation vessel 140 can be operated at any suitable conditions, such as no more than about 60° C., and about 250-about 500 kPa, preferably about 350-about 450 kPa.

The base 144 of the separation vessel 140 can have any suitable dimensions. Typically, the base 144 has a length 162 and a height 164 creating an interior space 148. Generally, the base 144 has a top 152 and a bottom 156. The length 162 can be greater than the height 164.

The stack 170 can be any suitable dimensions for receiving the three-phase stream 120. Typically, the stack 170 can have a width 172 and a height 174. Generally, the stack 170 is substantially cylindrical in shape having one or more walls 190 forming a void 200. Often, the height 174 can be greater than the width 172. Typically, the stack 170 is coupled to the base 144 at any suitable angle. Preferably, the stack 170 is coupled at an end 180 where the height 174 of the stack 170 can be orientated substantially perpendicular to the length 162 of the base 144.

The stack 170 can contain a packed bed 220. Usually, the packed bed 220 can include packing elements that increase the surface area of the interacting fluids. The packing elements can be any suitable packing. One exemplary packing is ring packing, such as RASCHIG packing material sold by Raschig GmbH LLC of Ludwigshafen, Germany. Other types of packing can include structured packing, fiber and/or film contactors, or tray systems, e.g. one or more trays, as long as suitable contact is attained. Typically, the ring packing can be any suitable dimensions, but is typically about 1-about 5 cm in diameter. The packing elements can be made from any suitable material, including carbon steel, stainless steel, or carbon.

Generally, the stream 120 can enter the stack 170 via a distributor 210 with vapor rising into the packed bed 220. Although the packed bed 220 is depicted, such a bed can be optional. Often, the distributor 210 can be a pipe forming differing sized slots. Some liquid can be removed from the vapor and fall into the base 144 along with the liquid from the stream 120. A second or remaining fluid, often a gas, can exit the stack 170 from a line 230, as hereinafter described.

The wash oil, liquid disulfide, and aqueous caustic phases can enter the base 144 from the stack 170. The base 144 can include a coalescer 160. Often, the coalescer 160 can include at least one of a metal mesh, one or more glass fibers, sand, or an anthracite coal. The various liquid phases can pass through the coalescer 160 and be separated. Generally, the wash oil and the disulfide phase can exit as an effluent 166, and optionally pass through a filter, such as a sand filter. The filter can remove any traces of caustic before passing an effluent.

Generally, the alkaline material, such as caustic, can exit the bottom 156 of the base 144 as another effluent 168. The another effluent 168 may be recycled to an extractor vessel, as disclosed in, e.g., U.S. Pat. No. 8,028,975.

The gases passing in the line 230 can be split in a first line 234 and a second line 238 before entering the vortex contacting device 260. Although the two lines 234 and 238 are depicted in FIG. 1, a single line may be utilized to provide gases to the vortex contacting device 260. The vortex contacting device 260 may include a wall 262, a baffle or first baffle 264, a second baffle 268, and a flow directing device 580, such as a guiding vane swirler 580, as described in further detail hereinafter. Optionally, the vortex contacting device 260 may also include, independently, a central blade rotator 290 and at least one ring 372, preferably a series of concentric rings. The first baffle 264 can form a first upper end 274 and the second baffle 268 can form a second upper end 278. Generally, the central blade rotator 290 is positioned proximate to the first baffle 264 and the second baffle 268, typically positioned substantially equidistant between the baffles 264 and 268. The first baffle 264 and the wall 262 may form a first passageway 294, and the second baffle 268 and the wall 262 may form a second passageway 298. The guiding vane swirler 580 can be positioned at least partially in the first passageway 294 and the second passageway 298.

Figure 3:
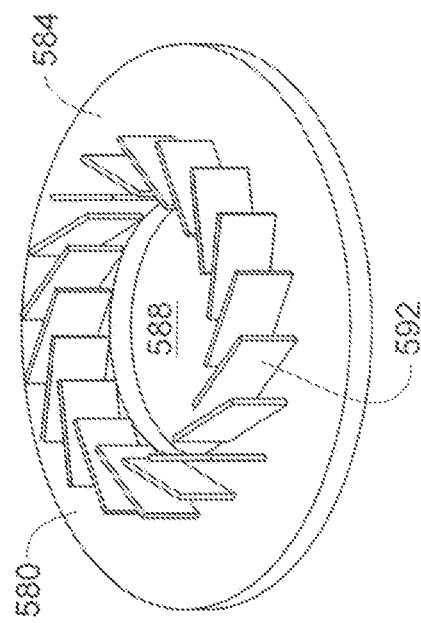
FIG. 3 is a perspective view of an exemplary flow directing device.

Referring to FIG. 3, the guiding vane swirler 580 can include a body 584 forming a washer-shape and a circular void 588 therein. A series of rectangular plates 592 may be coupled to the body forming a series of tangential slits. Although eighteen rectangular plates 592 are depicted in FIG. 3, only one rectangular plate 592 is numbered. Furthermore, any suitable number of rectangular plates 592 may be used. Rotating the guiding vane swirler 580 can create a bubbling layer adjacent to the rectangular plates 592 inside the circular void 588. Although the body 584 is described as being a washer-shape and the plates 592 rectangular, any suitable shape or dimension may be utilized.

Figure 4:
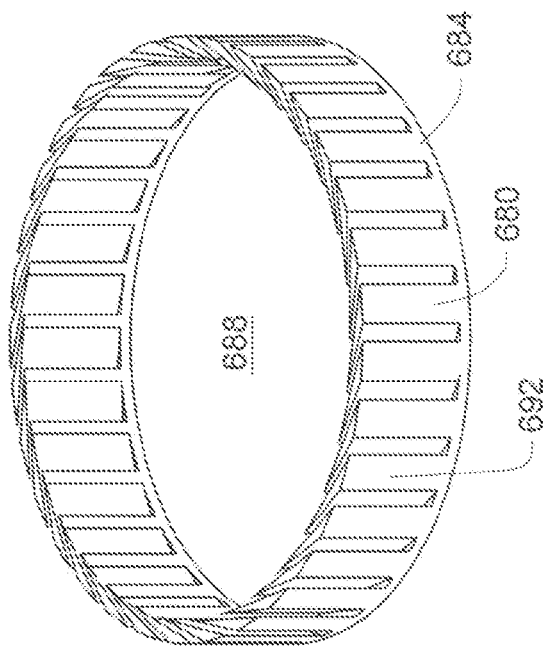
FIG. 4 is a perspective view of another exemplary flow directing device.

Referring to FIG. 4, another exemplary flow directing device 680 is depicted. The flow directing device 680 can include a body 684 being substantially ring-shaped surrounding a circular void 688 with a series of wedge-shaped vanes 692 extending from the periphery forming tangential slits. Although thirty-three vanes 692 are depicted in FIG. 4, only one vane 692 is numbered. Furthermore, any suitable number of wedge-shaped vanes 692 may be utilized. Rotating the flow directing device 680 can create a bubbling layer adjacent to the wedge-shaped vanes 692 inside the circular void 688. The flow directing device 680 may be used instead of the guiding vane swirler 580 that is depicted in FIG. 1.

Referring back to FIG. 1, the guiding vane swirler 580 can receive one or more gases from the stack 170 from the first line 234 through the first passageway 294 and from the second line 238 through the second passageway 298. If a single line is utilized, gases may be provided only to a single passageway, such as the first passageway 294. A hydrocarbon stream 288 having a boiling point of about 50-about 300° C. may be provided inside the guiding vane swirler 580. Typically, the hydrocarbon stream 288 in a liquid phase can be a wash oil that may include hydrotreated heavy naphtha or kerosene with little or no sulfur. The hydrocarbon stream 288 can also be a diesel oil. Optionally, the hydrocarbon stream 288, such as a wash oil, can be cooled to a temperature of no more than about 38° C. or about 25-about 43° C. to reduce or prevent corrosion in equipment and piping in gas service. Generally, it is preferable that the hydrocarbon stream 288 has less than about 10 ppm, preferably less than about 1 ppm, by weight, of sulfur. The mass rate flow of the hydrocarbon stream 288 to the gases in the line 230 may be about 1:20-about 1:50. Thus, a relatively small amount of hydrocarbons may be used to wash the gases.

The first and second baffles 264 and 268 may form a circular inlet surface and a top portion with an internal tapering surface as the fluids rise in the vortex contacting device 260. The gases in the first and second passageways 294 and 298 can pass through the rectangular plates 592 of the guiding vane swirler 580 towards its center as depicted by the arrows in FIG. 1. The hydrocarbon stream 288 can pass upwards and mix with the gases entering the center of the guiding vane swirler 580. The gases and liquids can form a bubbling layer inside the guiding vane swirler 580.

The fluids can continue to flow upwards, swirl, and expand around the first and second upper end walls 274 and 278. Thus, fluid past the first and second upper end walls 274 and 278 can expand to accommodate the full volume permitting separation of the gas from the liquid inside the vortex contacting device 260. Generally, liquid films can rise along the interior of the first and second baffles 264 and 268. Including the ring 372 can reduce entrainment of liquid next to the first and second baffles 264 and 268. Thus, liquid can be channeled back to the bubbling layer inside the guiding vane swirler 580. Moreover, the central blade rotator 290 may improve gas circulation near the axis region at the center of the vortex contacting device 260 by imparting additional swirl to prevent entrainment of liquid droplets. Additionally, it may be desirable to profile the end walls of the vortex contacting device 260 to promote stable operation.

Gases can escape from a line 300 to exit the vortex contacting device 260. Generally, the total sulfur in the air exiting the vortex contacting device 260 can be no more than about 100 ppm, by weight. As such, the gas can be sent or optionally blended with fuel gas for use as a fuel in a heater or furnace. Alternatively, the gas may be sent to a vent tank to remove any remaining liquid and then routed to a filter, such as a carbon filter, to remove any remaining hydrocarbons. Next, the filtered gases may be vented to the atmosphere.

The organic disulfide compounds can be stripped from the one or more gases and collect in the wash oil that can drop and exit from the guiding vane swirler 580 via a drain as a liquid stream 284. The liquid stream 284 can be provided to the base 144 of the separation vessel 140. Exemplary flow directing devices are disclosed in, e.g., U.S. Pat. No. 8,047,509. Although the vortex contacting device 260 is depicted outside the stack 170, it is contemplated that the vortex contacting device 260 can be incorporated inside the stack 170 above the distributor 210, and optionally the packed bed 220 if present, in other embodiments.

Figure 2:
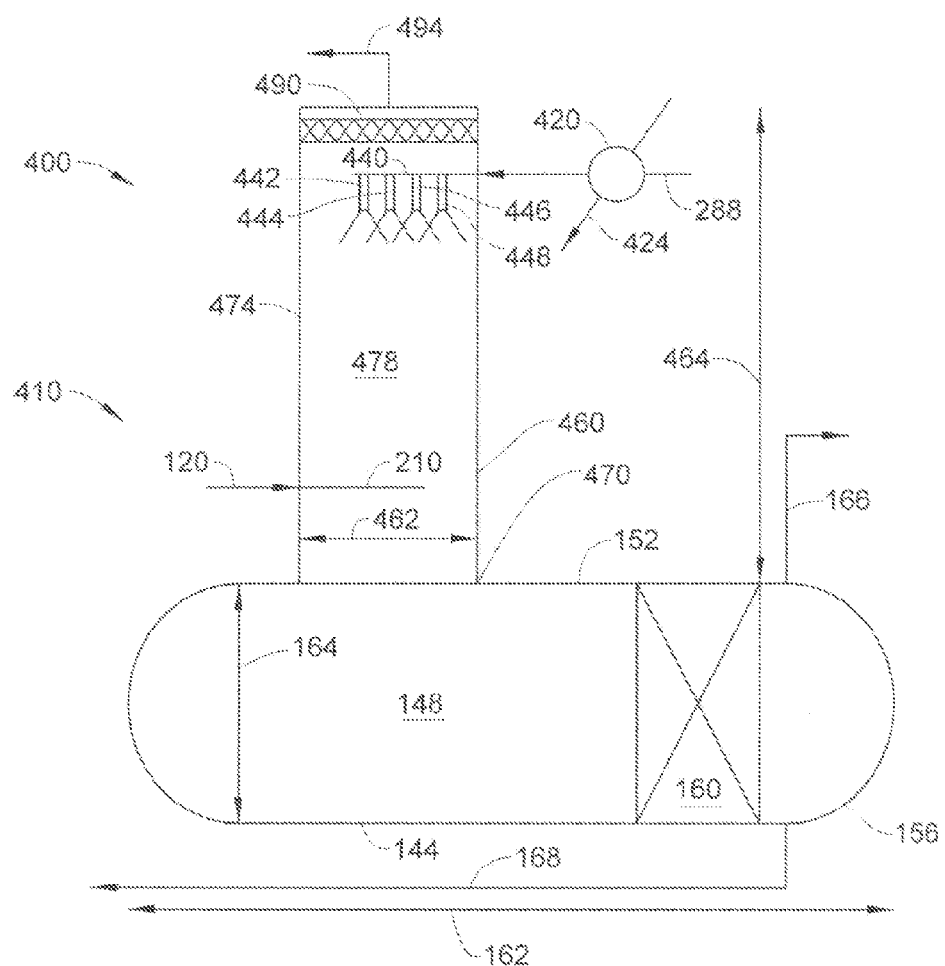
FIG. 2 is a schematic, cross-sectional depiction of another exemplary apparatus.

Referring to FIG. 2, another apparatus 400 may include another separation vessel 410 having the base 144 and a stack 460. The base 144 can be the same as described above for FIG. 1. The stack 460 may include one or more walls 474 forming a substantially cylindrical shape surrounding a void 478. The stack 460 can be any suitable dimension for receiving the three-phase stream 120. Usually, the stack 460 can have a width 462 and a height 464 with the height 464 greater than the width 462. Typically, the stack 460 is coupled to the base 144 at any suitable angle. Preferably, the stack 460 is coupled at an end 470 where the height 464 of the stack 460 can be orientated substantially perpendicular to the length 162 of the base 144.

The one or more walls 474 can contain a demister 490. The demister 490 can be any suitable demister for removing liquid particles from a rising gas. Generally, the demister 490 can be a mesh or a vane demister.

The stream 120 can be provided to the stack 460 via the distributor 210, as described above. Moreover, the hydrocarbon stream 288, as discussed above, may also be provided to the stack 460. Often, the temperature of the hydrocarbon stream 288 prior to being cooled may be about 38-about 60° C. The hydrocarbon stream 288 can be passed through an exchanger or a water cooler 420. Typically, the cooling water exchanger 420 can receive a cooling water stream 424 to lower the temperature of the hydrocarbon stream 288 effective to minimize corrosion. The temperature of the hydrocarbon stream 288 exiting the exchanger 420 can be less than about 38° C., no more than about 36° C., and no more than about 32° C. Alternatively, the temperature of the hydrocarbon stream 288 can be about 25-less than about 38° C., preferably about 25-no more than about 32° C.

The hydrocarbon stream 288 can enter the stack 460 via another distributor 440. The another distributor 440 can be coupled to one or more nozzles, namely a first nozzle 442, a second nozzle 444, a third nozzle 446, and a fourth nozzle 448. Although four nozzles are depicted, any suitable number of nozzles may be utilized. Any suitable nozzle can be utilized that can provide one or more sprays, such as a flat spray, a solid stream spray, a full cone spray, a hollow cone spray, a fine spray, an oval spray, and a square spray with angles varying up to about 170 degrees. As an example, the spray can be a hollow cone spray as depicted in FIG. 2.

The finely dispersed wash oil can then fall downward from the another distributor 440 and mix with the gas passing upward from the distributor 210 to adsorb the disulfide compounds. The organic disulfide compounds can be stripped from the gas and collect in the wash oil that can drop from the stack 460 to the base 144 below, where the liquid exits as two phases as discussed above. The cooled gas can rise upward and pass through the demister 490 where any entrained liquid is removed. Afterwards, the gas can pass upwards through the stack 460 and exit via the line 494. Generally, the total sulfur in the air exiting the stack 460 can be no more than about 100 ppm, by weight. As such, the gas can be sent or optionally blended with fuel gas for use as a fuel in a heater or furnace.

Alternatively, the gas may be sent to a vent tank to remove any remaining liquid and then routed to a filter, such as a carbon filter, to remove any remaining hydrocarbons. Next, the filtered gases may be vented to the atmosphere. In a further exemplary embodiment, the another distributor 440 can be positioned outside the stack 460 and placed in another vessel adapted to receive the gas in the line 494 in other embodiments.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A separation vessel, comprising:
   A) a base defining an interior space at least for separating one liquid phase from another liquid phase, wherein the base comprises a coalescer positioned in the interior space;
   B) a stack adapted to receive a fluid comprising one or more phases and coupled to the base; wherein the stack defines a void and consists of:
      1) one or more walls surrounding the void;
      2) a first distributor positioned within the void; and
      3) a second distributor positioned above the first distributor and at least one spray nozzle coupled to the second distributor; and
   wherein a portion of the void within the stack that is between the first distributor and the second distributor is open such that gas is free to pass upwards between the first distributor and the at least one spray nozzle and liquid is free to pass downwards between the at least one spray nozzle and the first distributor.

2. The separation vessel according to claim 1, wherein the separation vessel further comprises a base having a length greater than its height, and the height of the stack is orientated substantially perpendicular to the length of the base.

3. The separation vessel according to claim 1, wherein the stack comprises the one or more walls forming a substantially cylindrical shape.

4. The separation vessel according to claim 1, wherein the coalescer further comprises at least one of a metal mesh, one or more glass fibers, sand, and anthracite coal.

5. The separation vessel according to claim 1, further comprising a demister positioned above the second distributor in the stack.

* * * * *